United States Patent [19]

Clark

[11] 4,192,289
[45] Mar. 11, 1980

[54] SOLAR HEAT COLLECTION SYSTEM

[76] Inventor: David J. Clark, 118 Nobscot Rd., Sudbury, Mass. 01776

[21] Appl. No.: 913,873

[22] Filed: Jun. 8, 1978

[51] Int. Cl.² .............................................. F24J 3/02
[52] U.S. Cl. .............................. 126/425; 250/203 R; 126/438
[58] Field of Search ................. 126/270, 271; 60/641; 250/203 R; 350/289; 353/3; 136/206

[56] References Cited

U.S. PATENT DOCUMENTS

| | | | |
|---|---|---|---|
| 2,141,330 | 12/1938 | Abbot | 126/271 X |
| 3,213,285 | 10/1965 | McClusker | 60/641 X |
| 3,305,686 | 2/1967 | Carter et al. | 126/270 X |
| 3,713,727 | 1/1973 | Markosian et al. | 126/271 X |
| 3,914,029 | 10/1975 | Hoplock | 350/289 |
| 3,917,942 | 11/1975 | McCay | 126/270 X |
| 3,924,604 | 12/1975 | Anderson | 126/270 |
| 4,013,885 | 3/1977 | Blitz | 126/270 X |
| 4,082,947 | 4/1978 | Haywood et al. | 250/203 R |

Primary Examiner—James C. Yeung
Assistant Examiner—Larry Jones
Attorney, Agent, or Firm—John E. Toupal

[57] ABSTRACT

A solar energy collection system including a reflector composed of a plurality of discrete planar reflector segments, each of uniform area and supported on a frame in an array having a substantially paraboloidal shape. Rotational movement of the frame about first and second axes is produced, respectively, by first and second drive mechanisms that respond to a control circuit to produce sun tracking movement of the array. A collector having a planar collection surface with dimensions that are two times those of each of the light reflecting surfaces is positioned to receive reflected energy therefrom. Preferably, the first rotational axis is substantially normal to the energy collection surface of the collector and is aligned substantially with the center of the array and the second rotational axis bisects the array. Energization of the first drive mechanism by the control circuit produces rotation of the frame about the first axis to maintain the second axis normal to a plane defined by the center of the array, the center of the collection surface and the sun while energization of the second drive mechanism produces rotation of the frame about the second axis to maintain the array normal to the bisector of the angle defined by the center of the array, the center of the collection surface and the sun.

22 Claims, 9 Drawing Figures

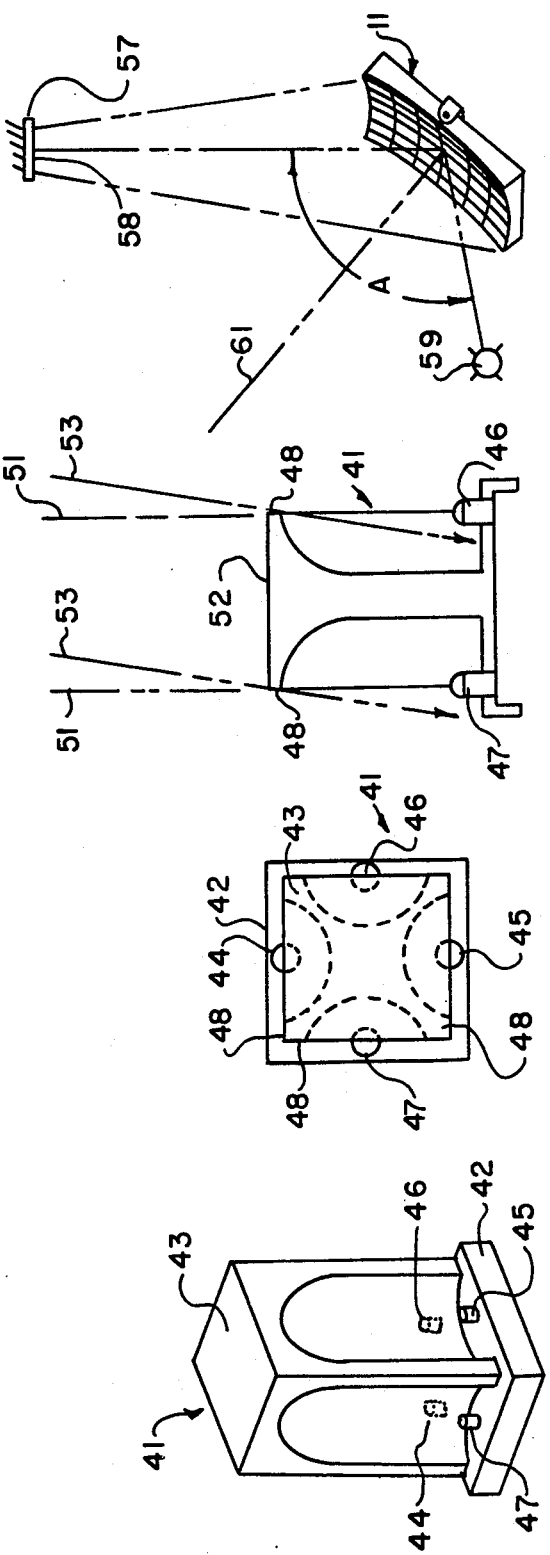

SOLAR HEAT COLLECTION SYSTEM

BACKGROUND OF THE INVENTION

This invention relates generally to apparatus for collecting solar energy and, more particularly, to such an apparatus for concentrating a high level of solar radiation onto a relatively small collection surface.

While individual solar units are presently being used in some parts of this country for heating, air conditioning and hot water, it has generally been more economical to use cheaper alternatives such as electricity or gas. In addition to the initial cost of the solar collection equipment it has also been necessary to provide 100 percent standby capacity for use during protracted periods of bad weather. With the present incentive to conserve natural resources, past considerations in opposition to the use of solar collection equipment are no longer as impelling.

In the past, systems for utilizing solar energy have consisted, generally, of: (1) a flat-plate collector having a large glazed surface for absorbing the sun's heat, said glazed surface comprising one or more sheets of glass or a radiation-transmitting plastic film or sheet; (2) tubes or fins for conducting or directing a heat-transfer fluid from an inlet duct to an outlet and thence to an insulated storage area; (3) a metallic plate which may be flat, corrugated, or grooved, to which the tubes or fins are attached in a manner which produces a good thermal bond; (4) insulation, to minimize downward heat loss from the plate; and (5) a container or casing which holds the foregoing components and protects them. Such systems have been constructed from many different materials and in a wide variety of designs. Flat-plate collectors have been arranged in series and in parallel, and are usually deployed in large numbers together, facing south in the United States. They have been used to heat such fluids as water, water plus ethylene glycol, water plus ammonia, fluorinated hydrocarbons, air and other gases. Pumps are usually provided to circulate the heat-transfer fluid through the collector and to thereby provide space heat, hot water or air conditioning.

The most significant disadvantage of flat plate collectors results from their relatively large surface areas. Since the rate of heat loss by radiation and convention is dependent upon collection surface area, the efficiency of flat plate collectors diminishes rapidly with decreases in ambient temperatures and can even reach zero at temperatures around 0° F. and below. This problem is particularly significant in the northern latitudes in which energy requirements for heating purposes are highest in the periods of lowest ambient temperature.

Several studies have shown that temperatures far above those attainable by flat-plate collectors can be reached if a large amount of solar radiation is concentrated upon a relatively small collection area. To this end, paraboloidal concentrators, similar to searchlight reflectors, have been developed to follow the apparent movement of the sun. These and other diurnal tracking devices have attained relatively high temperatures but require, in general, complicated mechanisms for their operation and can use only the direct rays of the sun, since diffuse radiation cannot be concentrated. In addition, the problems associated with the fabrication of paraboloidal reflective surfaces substantially increases the overall cost of a collection system.

The object of this invention, therefore, is to provide an improved, relatively low cost solar energy collection system that exhibits high efficiency, particularly in the northern latitudes.

SUMMARY OF THE INVENTION

The invention is a solar energy collection system including a reflector composed of a plurality of discrete planar reflector segments, each of uniform area and supported on a frame in an array having a substantially paraboloidal shape. Rotational movement of the frame about first and second axes is produced, respectively, by first and second drive mechanisms that respond to a control circuit to produce sun-tracking movement of the array. A collector having a planar energy collection surface with dimensions substantially two times those of each of the light reflecting surfaces is positioned to receive reflected energy therefrom. Preferably, the first rotational axis is substantially normal to the energy collection surface of the collector and is aligned substantially with the center of the array and the second rotational axis bisects the array. Energization of the first drive mechanism by the control circuit produces rotation of the frame about the first axis to maintain the second axis normal to a plane defined by the center of the array, the center of the collection surface and the sun while energization of the second drive mechanism produces rotation of the frame about the second axis to maintain the array normal to the bisector of the angle defined by the center of the array, the center of the collection surface and the sun. The use of planar reflector surfaces and a relatively small collection surface approximately twice the size of each reflector segment provides a relatively low cost system with excellent energy collection efficiency because of a minimization of collector heat losses through radiation and conduction to the atmosphere. Efficiency is further enhanced by the tracking system that causes the sun's reflected energy to strike a stationary collection surface from substantially sunrise to sunset throughout the year.

In a featured embodiment of the invention, the control circuit includes a light sensor mounted on the frame so as to undergo angular motion therewith and oriented so as to produce an output signal dependent upon the orientation of received sunlight. A sensor drive coupled to the second drive mechanism of the frame produces relative angular motion between the frame and the sensor equal to the angular motion produced by rotation of the frame about the second axis. Because of the reflective angles involved, proper alignment of the reflector segments and collector surface require angular motion of the reflector frame equal to one-half the angular motion of the sun. Therefore, the sensor drive means doubles the angular motion of the sensor relative to the frame so as to insure proper alignment between the sensor and the sun.

Another feature of the invention is the provision of a solar energy collection system utilizing a plurality of reflector arrays of the type described above. Each of the reflector arrays is mounted for rotation about a pair of axes that facilitate the above-described tracking of the sun and permit each reflector array to reflect sunlight onto a single collector surface. The use of a plurality of reflector arrays with a single collector further improves the overall collection efficiency of the system.

Another feature of the invention is the provision of a de-activation circuit that de-activates the control circuit to prevent tracking movement of the array in response to a predetermined decrease in the level of solar radiation received by the sensor. The de-activation circuit prevents the control circuit for producing energizing signals for the drive mechanisms of the array during a delay period established by a capacitor discharge time. By terminating tracking for a given period after a predetermined reduction in received solar energy, the de-activation circuit prevents the undesirable tracking of a bright edge of a cloud that is blocking the direct rays of the sun.

DESCRIPTION OF THE DRAWINGS

These and other features and objects of the present invention will become more apparent upon a perusal of the following description taken in conjunction with the accompanying drawings wherein:

FIG. 4 is a schematic perspective view of a sensor mounted on the reflector unit shown in FIGS. 1-3;

FIG. 5 is a top schematic top view of the sensor shown in FIG. 4;

FIG. 6 is a schematic cross-sectional view of the sensor shown in FIGS. 4 and 5;

FIG. 7 is a schematic perspective view illustrating the reflector of FIGs. 1-3 in operative alignment with the sun and a collector element;

DESCRIPTION OF THE PREFERRED EMBODIMENT

Figure 3:
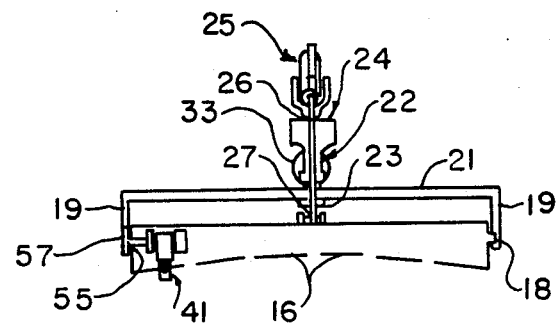
FIG. 3 is a schematic top view of the reflector unit shown in FIGS. 1 and 2.
Figure 1:
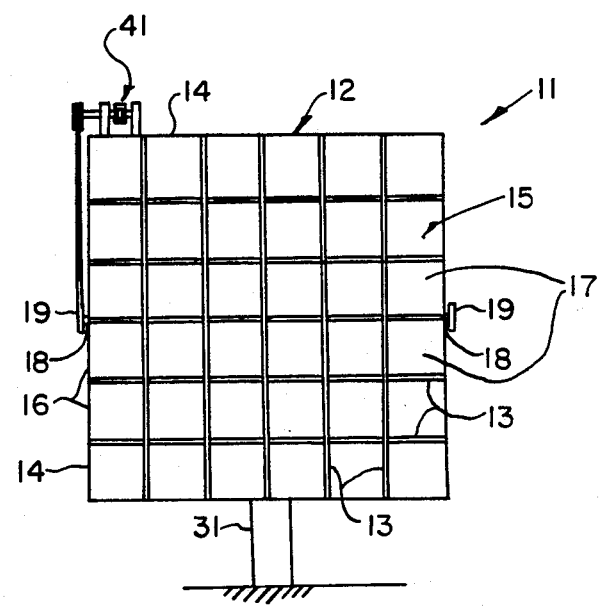
FIG. 1 is a schematic front view of a reflector unit utilized in the present invention.
Figure 2:
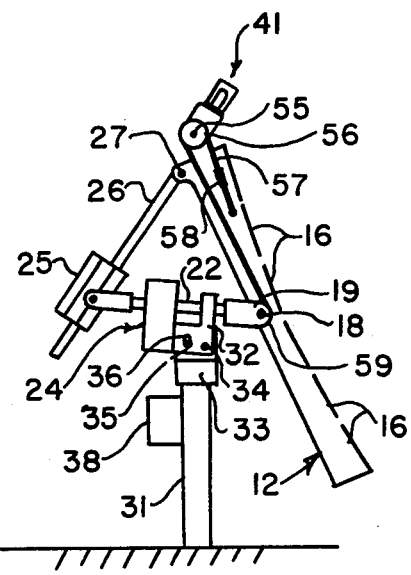
FIG. 2 is a schematic side view of the reflector unit shown in FIG. 1.

Referring now to FIGS. 1-3, there is shown a reflector unit 11 including a square frame 12 formed by a plurality of transverse supports 13 extending between opposite sides of a square base structure 14. Retained by the frame 12 is an array 15 of discrete reflector segments 16 each having a planar reflective surface 17. The frame 12 is shaped and arranged so as to support the reflector segment array 15 in a paraboloidal form.

The mid-points of opposite edges of the frame 12 retain pivot pins 18 that are received by ears 19 formed on the ends of a yoke 21. Fixing the mid-section of the yoke 21 to a rotary shaft 22 for rotation therewith is a collar 23. Rotation of the shaft 22 is provided by a conventional reversible rotary drive mechanism 24. Also supported for rotation with the rotary shaft 22 is a conventional reversible linear drive mechanism 25. A reciprocable shaft 26 is operatively coupled to the linear drive mechanism 25 and has an end 27 pivotally secured to the frame 12 at a position thereon spaced from the yoke 21. Selective energization of the rotary drive mechanism 24 causes the frame 12 and the reflector element array 15 to rotate either clockwise or counterclockwise around a first axis defined by the rotary shaft 22. Similarly, selective energization of the linear drive mechanism 25 produces either forward or backward movement of the reciprocable rod 26 and causes the attached frame 12 and array 15 to rotate either forwardly or backwardly about a second axis defined by the pivot pins 18 and which transversely bisect the face of the array 15.

The entire reflector unit 11 is mounted on a mast 31 that is secured to bracket portions 32 of the rotary drive mechanism 24 by a collar 33. Securing the collar 33 to the bracket portions 32 are a first bolt assembly 34 and a second bolt assembly 35 that extend through vertical slots 36 in the bracket portions 32. The vertical orientation of the rotary shaft 22 relative to the mast 31 can be modified by adjusting the position within the slots 36 of the bolt assembly 35 before tightening thereof. Similarly, the horizontal orientation of the rotary shaft 22 can be adjusted by rotation of the collar 33 on the mast 31 prior to setting of a set screw (not shown). Also mounted on the mast 31 is a housing 38 that retains an electrical control circuit for energizing the rotary drive mechanism 24 and the linear drive mechanism 25.

Mounted on the upper edge of the frame 12 and electrically connected to the control circuit retained in the housing 38 is a sensor 41 that is shown most clearly in FIGS. 4-6. The sensor 41 includes a base portion 42 and a hood portion 43. Mounted adjacent mid-points of opposite edges of the base portion 42 is a first pair of photo-transistors 44 and 45 while a second pair of photo-transistors 46 and 47 is retained adjacent the midpoints of the base's other pair of edges. The photo-transistors 44-47 are lensed to provide a small ten-degree light input cone of high sensitivity. As shown in FIG. 5, the upper edges 48 of the hood 43 are aligned with the centers of the photo-transistors 44-47. Thus, rays 51 of the sun directed perpendicular to the sensor 41 provide equal illumination of oppositely located photo-transistors 44, 45 and 46, 47. Conversely, rays 53 of the sun directed acutely towards the sensor 41 produce unequal illumination of the photo-transistors 44-47 and therefore unequal electrical outputs therefrom. During use the photo-transistors 44 and 45 are aligned with north and south and the photo-transistors 46 and 47 are aligned with east and west and the electrical outputs thereof are used in a control circuit to produce tracking of the sun by the reflector unit 11 as described hereinafter.

Referring now to FIG. 7, there is shown a solar energy collection system 56 utilizing a reflector unit 11 and a collector 57 having a planar collection surface 58. One of the many conventional types of heat transfer systems (not shown) would be utilized with the collector 57 to recover solar heat collected thereby. In a preferred embodiment of the invention, the dimensions of the collection surface 58 of the collector 57 are approximately twice those of each of the reflective surfaces 17 on the reflector segments 16 of the array 15. That relationship establishes a substantially minimum collection surface area 58 for receiving substantially all of the energy reflected by each of the reflector segments 16 from sunrise to sunset for the entire year in the northern latitudes. Thus, the two-to-one reflection surface size relationship provides for maximum collection of reflected solar energy while minimizing radiation and conduction heat loss from the collector 57.

During installation of the system 56, the reflector unit 11 is adjusted on the mast 31 so as to align the first rotational axis defined by the rotary shaft 22 with the center of the collection surface 58. Thereafter, the sensor 41 produces outputs that cause the reflector unit 11 to track the sun as described below. Energization of the rotary drive mechanism 24 in response to sensor output produces rotation of the frame 12 about the first axis defined by the rotary shaft 22 so as to maintain the second axis defined by the pivot pins 18 normal to a plane defined by the center of the array 15, the center of the collection surface 58 and the sun 59. Also in response to output of the sensor 41, the linear drive mechanism 25 is energized to produce rotation of the frame 12 about the second axis defined by the pivot pins 18 so as to maintain the array 15 normal to the bisector 61 of the angle A defined by the center of the array 15, the center of the collection surface 58 and the sun 59. This is, of course, the angle created between rays of the sun directed onto the reflector 11 and those reflected by the reflector segments 16 onto the collection surface 58. As a result of this arrangement the reflected energy from the sun is caused to reach the stationary collector 58 from substantially sunrise to sunset whenever the sun is shining throughout the year.

As shown in FIGS. 2 and 3, the sensor 41 is mounted for rotation on a shaft 55 that is keyed to a pulley 56 mounted on one edge of the frame 12. Extending around the pulley 56 is a belt 57 having one end attached to a return spring 58 secured to the frame 12. The opposite end of the belt 57 extends around a pulley 59 formed by one of the ears 19 on the yoke 21 and is attached thereto. Depending upon the direction of rotation of the frame 12 about the pivot pins 18, the belt 57 is either wrapped upon or withdrawn from the pulley 59 by the return spring 58. This in turn produces rotation of the pulley 56 and attached sensor 41 in the same sense as the motion experienced by the frame 12. Furthermore, the diameters of the pulleys 56 and 59 are equal so that the angular motion produced by the sensor drive assembly is exactly equal to the motivating angular motion experienced by the frame 12. Doubling the angular motion of the sensor relative to the reflector unit 11 maintains both in proper alignment with the sun since, because of the reflection angle involved, the reflector unit 11 is required to undergo only one-half the angular motion of the sun in order to maintain alignment.

Figure 8:
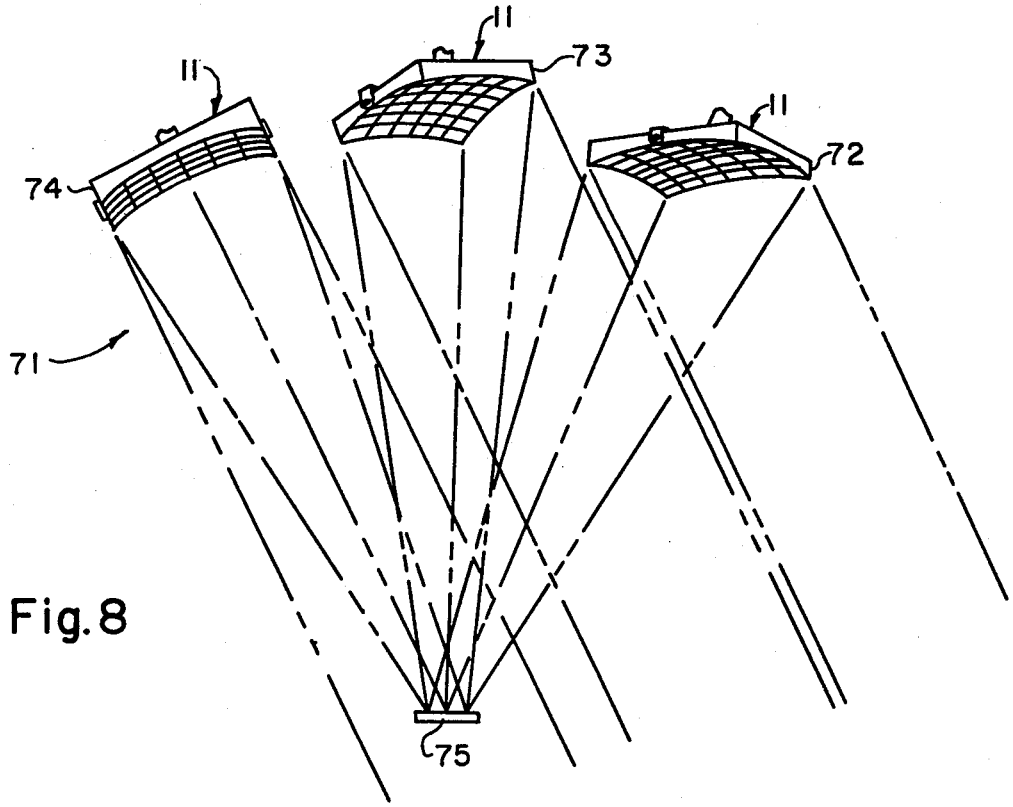
FIG. 8 is a schematic view of a system utilizing a plurality of reflector units operatively aligned with a single collector.

FIG. 8 shows another solar energy collection system 71 including a plurality of reflector units 72–74 all associated with a common collector plate 75. Each of the reflector units 72–74 is identical to the reflector unit 11 shown in FIGS. 1–3. In use, each of the reflector units 72–74 is aligned with the collector plate 75 as described above. Thereafter, each unit's control system produces tracking of the sun as also described above. Consequently, substantially all of the units 72–74 receive sunlight through the day and substantially all of that energy is reflected onto the surface of the single collection plate 75 which has a size approximately twice that of each individual segment of the reflector units 72–74. The use of plural units with a single collector further enhances the efficiency of the collection system.

Figure 9:
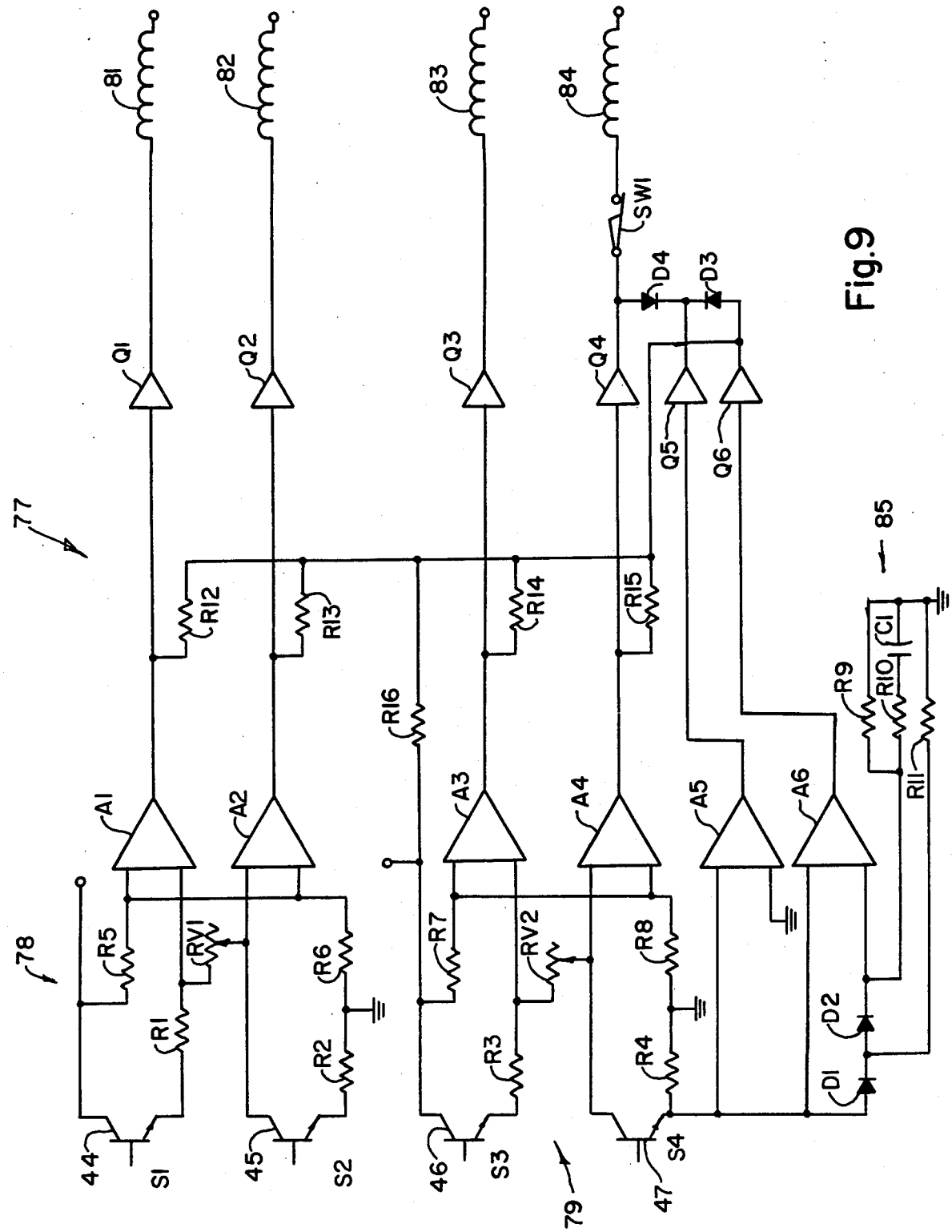
FIG. 9 is a schematic circuit diagram of a control circuit utilized with the reflector unit shown in FIGS. 1-3.

Referring now to FIG. 9, there is shown a tracking control circuit 77 that is retained by the housing 38 and supplies energizing signals to the rotary drive mechanism 24 and the linear drive mechanism 25. The control circuit 77 includes a first balanced bridge circuit 78 have legs that include the sensors 44 and 45 and a second balanced bridge circuit 79 having legs that include the sensors 46 and 47. Also included in the legs of the bridge circuits 78 and 79 are resistors R1-R8 while variable resistors RV1 and RV2 permit sensitivity adjustment. In response to an unbalance of the bridge 78 caused by unequal energization of the sensors 44 and 45 either of a pair of differential amplifiers A1 or A2 produce an output that triggers either of a pair of transistors Q1 or Q2. Current from the transistor Q1 energizes a relay 81 that activates the linear drive mechanism 25 to cause downward pivotal movement of the array 15 about the axis 18 while current from the transistor Q2 energizes a relay 82 that activates the linear drive mechanism 25 to produce upward pivotal movement of the array 15. Similarly, an unbalance of the bridge circuit 79 caused by unequal energization of the sensors 46 and 47 produces an output from either of a pair of differential amplifiers 83 or 84 to trigger either of a pair of transistors Q3 or Q4. Current from the transistor Q3 energizes a relay 83 that activates the rotary drive mechanism 24 to produce movement of the array 15 toward the west while current from the transistor Q4 energizes a relay 84 that activates the rotary drive mechanism 24 to produce movement of the array 15 toward the east. Supply voltage for the transistors Q1–Q4 is provided by a plurality of resistors R12-R16. Also included in the control circuit 77 is a differential amplifier A5 having one input connected to the sensor 47, a second input connected to ground and an output connected to a transistor Q5.

Also shown in FIG. 9 is a de-activation circuit 85 that includes a differential amplifier A6 with a first input connected to a junction between the sensor 47 and the resistor R4 in the bridge circuit 79. A second input of the amplifier A6 is connected to the first input by a pair of diodes D1 and D2. Connected across the diode D2 is a delay circuit comprising resistors R9-R11 and a capacitor C1. The output of the amplifier A6 is received by a transistor Q6 connected to the supply resistors R12-R16. Connected between the outputs of the transistors Q5 and Q6 is a diode D3 while a diode D4 connects the outputs of the transistors Q4 and Q5.

A problem with prior balanced tracking systems is that they inherently tend to track the bright edge of a cloud as the cloud blocks the direct rays of the sun, thus causing the system to go several degrees out of alignment before the sun reappears after the cloud passes. This problem is overcome in the present invention by the de-activation circuit 85. The capacitor C1 is charged while the sensor 47 is in full sun's rays (or any level that produces a shadow) through the diodes D1, D2 and the resistor R10. A sudden reduction in the sun's intensity causes the voltage level of the resistor R4 to drop, thus applying a reverse bias on the amplifier A6. Consequently, the amplifier A6 turns the transistor Q6 on and removes supply voltage to the transistor Q1, Q2, Q3 and Q4 through the resistors R12, R13, R14, R15 and R16. Thus tracking is suspended until the capacitor C1 discharges through the resistors R10 and R9 to a level lower than the resistor R4. The time is controlled by the values of the capacitor C1, the resistors R9, R10 and the current intensity level of the resistor R4. Reappearance of the sun rises the voltage on the resistor R4 and tracking resumes. The diode D1 and the resistor R11 function to provide a voltage spread sufficient for normal tracking variations of the resistor R4.

After sunset the sensor 47 senses dark conditions and reduces the voltage level of the resistor R4 to 0, thus removing the positive bias on the amplifier A5. Consequently, the amplifier A5 turns the transistor Q5 on and removes supply voltage to the transistors Q1–Q4 through the diode D3 as in cloud sensing to suspend tracking. Through the diode D4, the relay 84 is turned on independently to return the reflector 15 to a position ready for tracking the next day. A switch SW1 can be used to control position.

Obviously, many modifications and variations of the present invention are possible in light of the above teachings. It is to be understood, therefore, that the invention can be practiced otherwise than as specifically described.

What is claimed is:

1. Solar energy collection apparatus comprising:
a reflector means comprising a frame and a plurality of discrete reflector segments with light reflecting surfaces and supported by said frame means in an array having a substantially paraboloidal shape;
drive means for producing rotational movement of said frame about first and second axes;
control means for energizing said drive means so as to produce sun tracking movement of said array, said control means comprising a sensor means responsive to the orientation of received sunlight;
a stationary collector means with a light collecting surface positioned to receive reflected energy from each of said reflector segments, said light collection surface being spaced from said light reflecting surfaces in a substantially southern direction; and
sensor drive means responsive to said control means for maintaining said sensor means in alignment with the sun.

2. An apparatus according to claim 1 wherein said first axis is substantially normal to said collection surface and is aligned substantially with the centers of said array and said collecting surface.

3. An apparatus according to claim 2 wherein said second axis bisects said array.

4. An apparatus according to claim 3 wherein said drive means comprises a first drive means for producing rotational movement of said frame about said first axis, and a second drive means for producing rotational movement of said frame about said second axis.

5. An apparatus according to claim 4 wherein said control means energizes said first drive means to produce rotation of said frame about said first axis that maintains said second axis normal to the plane defined by the center of said array, the center of said collection surface and the sun.

6. An apparatus according to claim 5 wherein said control means energizes said second drive means to produce rotation of said frame about said second axis that maintains said array normal to the bisector of the angle defined by the center of said array, the center of said collection surface and the sun, said angle having an apex at the center of said array.

7. An apparatus according to claim 6 wherein said reflecting surfaces and said collection surface are substantially planar.

8. An apparatus according to claim 6 wherein said first drive means comprises a rotary drive mechanism, and said second drive means comprises a linear drive mechanism extending transverse to said second axis and having an end secured to said frame at a position spaced from said second axis.

9. An apparatus according to claim 6 wherein said sensor means is mounted on said frame means in a position spaced from said second axis so as to undergo angular motion relative to the sun in response to rotation of said frame means about said second axis.

10. An apparatus according to claim 9 wherein said sensor drive means is adapted to produce relative angular motion between said frame means and said sensor means equal to and in addition to said angular motion produced by rotation of said frame means about said second axis.

11. An apparatus according to claim 10 wherein said sensor drive means is coupled to said second drive means so as to be responsive thereto.

12. An apparatus according to claim 6 wherein said light reflecting surfaces are of uniform size and said light collection surface has dimensions equal to substantially twice those of each of said light reflecting surfaces.

13. An apparatus according to claim 1 wherein said reflector means comprises a plurality of said frames each supporting a plurality of said discrete reflector segments in an array having a substantially paraboloidal shape, said drive means comprises a drive for producing rotational movement of each said frame about a different pair of rotational axes, said control means comprises a control for energizing each of said drives to produce sun-tracking movement of said supported array, each control comprising a sensor means responsive to the orientation of received sunlight, and said collector surface is a unitary surface positioned to receive light reflected from said reflecting surfaces in each of said arrays.

14. An apparatus according to claim 13 wherein all of said reflecting surfaces and said collection surface are substantially planar.

15. An apparatus according to claim 14 wherein one of said rotational axes for each frame is aligned substantially with the center of said array supported thereby and substantially normal to said collection surface and the other of said rotational axis bisects the face of said array.

16. An apparatus according to claim 1 including deactivation means for de-activating said control means in response to a predetermined decrease in the level of solar radiation received by said sensor means.

17. An apparatus according to claim 16 wherein said deactivation means comprises delay means for re-activating said control means after a time delay.

18. An apparatus according to claim 17 wherein said control means comprises a balanced bridge circuit including a plurality of sensors responsive to solar radiation, and a plurality of output circuit for providing energizing signals to said drive means; and said de-activation means comprises inhibit means for inhibiting said output circuits to prevent the generation of said energizing signals thereby in response to said predetermined decrease in the level of radiation received by said sensor means.

19. An apparatus according to claim 18 wherein said inhibit means comprises an amplifier having one input responsive to said level of solar radiation, a second input responsive to a signal level provided by said delay means and an output connected to said plurality of output circuits.

20. An apparatus according to claim 19 wherein said delay means comprises a capacitor means connected to said second input and changed in response to increases in the level of solar radiation received by said sensor means, and resistor means for discharging said capacitor means in response to decreases in the level of said received radiation.

21. Solar energy collection apparatus comprising:
receiver means for receiving energy from the sun;
a frame means supporting said receiver means;
drive means for producing movement of said frame means;

control means for energizing said drive means so as to produce sun-tracking movement of said frame means, said control means comprising a sensor means responsive to received solar radiation said control means comprising a balanced bridge circuit including a plurality of sensors responsive to solar radiation, and a plurality of output circuits for providing energizing signals to said drive means; and de-activation means for de-activating said control meams in response to a predetermined decrease in the level of solar radiation received by said sensor means, said de-activation means comprising a delay means for re-activating said control means after a time delay and inhibit amplifier means for inhibiting said output circuits to prevent the generation of said energizing signals thereby in response to said predetermined decrease in the level of radiation received by said sensor means, said inhibit amplifier means having one input responsive to said level of solar radiation, a second input responsive to a signal level provided by said delay means and an output connected to said plurality of output circuits, and said de-activation means further comprising a capacitor means connected to said second input and charged in response to increases in the level of solar radiation received by said sensor means, and resistor means for discharging said capacitor means in response to decreases in the level of said receiving radiation.

22. Solar energy collection apparatus comprising:

a reflector means comprising a frame and a plurality of discrete reflector segments with light reflecting surfaces of uniform area and supported by said frame means in an array having a substantially paraboloidal shape;

first and second drive means for producing rotational movement of said frame about first and second axes;

control means for energizing said drive means so as to produce sun tracking movement of said array and including a sensor means movably responsive to changes in the orientation of the sun; said control means being adapted to energize said first drive means to produce rotation of said frame about said first axis that maintains said second axis normal to a plane defined by the center of said array, the center of said collection surface and the sun, said angle having an apex at the center of said array, and a stationary collector means spaced from said array in a substantially southern direction and with a light collecting surface positioned to receive reflected energy from each of said reflector segments, said light collection surface having dimensions equal to substantially twice those of each of said light-reflecting surfaces.

* * * * *